United States Patent

Kropp

[11] Patent Number: 6,044,188
[45] Date of Patent: Mar. 28, 2000

[54] CONFIGURATION FOR COUPLING LIGHT INTO ONE END OF A MULTIMODE OPTICAL WAVEGUIDE

[75] Inventor: Jörg-Reinhardt Kropp, Berlin, Germany

[73] Assignee: Siemens Aktiengesellschaft, Munich, Germany

[21] Appl. No.: 09/301,136

[22] Filed: Apr. 28, 1999

Related U.S. Application Data

[63] Continuation of application No. PCT/DE97/02574, Oct. 28, 1997.

[30] Foreign Application Priority Data

Oct. 28, 1996 [DE]  Germany ............... 196 45 295

[51] Int. Cl.⁷ .................................................. G02B 6/32
[52] U.S. Cl. .................................. 385/33; 385/35; 385/43; 385/28
[58] Field of Search ............................ 385/33, 34, 35, 385/43, 28, 93

[56] References Cited

U.S. PATENT DOCUMENTS

| | | | |
|---|---|---|---|
| 4,076,375 | 2/1978 | Musaka et al. | 350/96.15 |
| 4,352,565 | 10/1982 | Rowe et al. | 356/360 |
| 4,915,468 | 4/1990 | Kim et al. | 350/96.15 |
| 5,077,819 | 12/1991 | Greil et al. | 385/79 |
| 5,274,721 | 12/1993 | Dickinson et al. | 385/31 |
| 5,490,227 | 2/1996 | Tanabe et al. | 385/29 |
| 5,745,625 | 4/1998 | Aikiyo et al. | 385/94 |

FOREIGN PATENT DOCUMENTS

| | | |
|---|---|---|
| 3126217A1 | 1/1983 | Germany. |
| 3617799A1 | 12/1987 | Germany. |
| 2083646A | 3/1982 | United Kingdom. |

OTHER PUBLICATIONS

Japanese Patent Abstract No. 08122586 (Akira), dated May 17, 1996.
Japanese Patent Abstract No. 61020913 (Satoshi), dated Jan. 29, 1986.
"A Single Mode Fiber Detector Receptacle with Mode Filter", 2244 Research Disclosure, Jan. 1991, No. 321, Emsworth Great Britain.

*Primary Examiner*—Hung N. Ngo
*Attorney, Agent, or Firm*—Herbert L. Lerner; Laurence A. Greenberg

[57] ABSTRACT

The configuration couples light into an end of a multimode optical waveguide through a pin stub of a single mode optical waveguide. In order to enable relatively wide-band signal transmission via the multimode optical waveguide, the pin stub has a light extraction region in which its cladding is surrounded by an outer coating of a material having a higher index of refraction than the index of refraction of the cladding material.

6 Claims, 1 Drawing Sheet

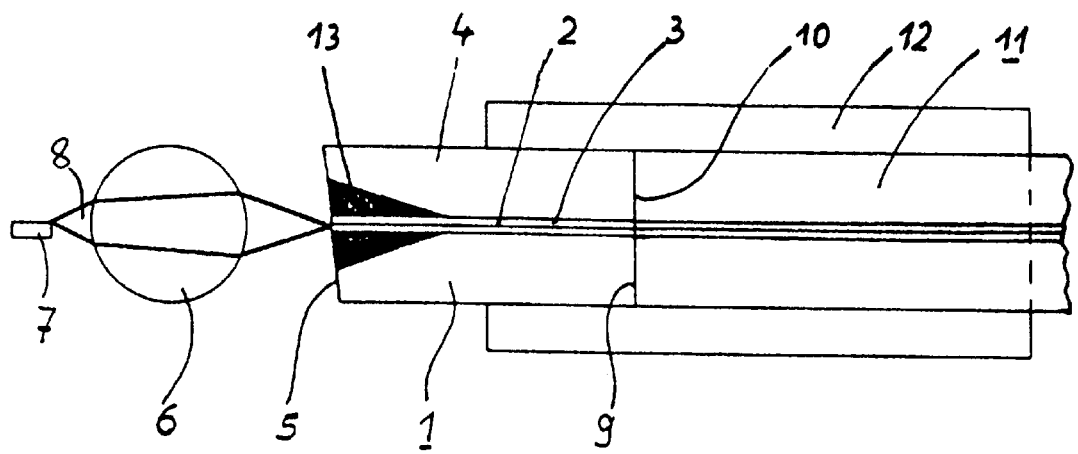

CONFIGURATION FOR COUPLING LIGHT INTO ONE END OF A MULTIMODE OPTICAL WAVEGUIDE

CROSS-REFERENCE TO RELATED APPLICATION

This is a continuation of copending International Application PCT/DE97/02574, filed Oct. 28, 1997, which designated the United States.

BACKGROUND OF THE INVENTION

FIELD OF THE INVENTION

The invention lies in the field of optical transmission technology. Specifically, the invention relates to a configuration for coupling light into one end of a multimode optical waveguide by means of a pin stub from a single mode optical waveguide. On the input side, there is an optical device that focuses the light to be coupled onto one face end of the pin stub, and the pin stub rests with its other face end on the one end of the multimode optical waveguide.

A prior art system of this type forms a coupling unit, with which, as in a conventional plug-to-plug coupling, an optical transmission line formed by an optical waveguide can be connected via a plug. The prior art configuration includes an optical device on the input side which is acted upon by the light to be coupled into the optical waveguide. The light to be coupled in is focussed by the optical device onto one face end of a pin stub from a single mode optical waveguide. With its other face end, the pin stub contacts one end of the optical waveguide that forms the optical transmission line. The prior art arrangement was developed for coupling light into a single mode optical waveguide, but it can readily be used to couple light into a multimode optical waveguide as well.

Multimode optical waveguides have been laid out extensively, especially over relatively short distances for transmitting information in the area of data communications, because relatively inexpensive data transmission systems can be made with such optical waveguides. A disadvantage of such data transmission systems having multimode optical waveguides is the bandwidth, which is dependent on the wavelength of the light employed and on the particular type of multimode optical waveguide; this bandwidth is relatively narrow compared with single mode optical waveguides. The bandwidth of data transmission systems with multimode optical waveguides is also negatively influenced by the type of light source used and by the coupling of the light, which carries the information in question, into the multimode optical waveguide. If a light-emitting diode (LED) is used as the light source, then a multimode optical waveguide is generally illuminated over virtually its entire face end to be coupled in, and thus virtually all the modes are excited. Because of the differences in transit times among the various modes, only a relatively narrow bandwidth is attainable. If a laser diode is used, a smaller number of modes in the multimode optical waveguide is excited, especially whenever a focusing optical device is also used between the laser diode and the multimode optical waveguide.

It is especially advantageous if, in addition to the focusing optical device, a pin stub from a single mode optical waveguide is used, since the number of modes in the downstream multimode optical waveguide that are excited is reduced because of the spatially narrowly bounded core of the single mode optical waveguide of the pin stub. However, because of the relatively short pin stub, a high proportion of the light coupled into the pin stub appears in the cladding of the single mode optical waveguide of the pin stub. Since when the pin stub is connected to the downstream multimode optical waveguide the adjacent face ends of these two optical waveguides rest flush against one another, some of the light in the cladding of the pin stub is then also coupled into the core of the multimode optical waveguide and excites higher modes. This narrows the bandwidth of the multimode optical waveguide.

SUMMARY OF THE INVENTION

It is accordingly an object of the invention to provide a configuration for coupling light into one end of a multimode optical waveguide, which overcomes the above-mentioned disadvantages of the heretofore-known devices and methods of this general type and which leads to a lesser number of excited modes in the multimode optical waveguide and therefore lends a transmission device with a multimode optical waveguide a relatively wide bandwidth.

With the foregoing and other objects in view there is provided, in accordance with the invention, a configuration for coupling light into a multimode optical waveguide, comprising:

a pin stub of a single mode optical waveguide, the pin stub having a cladding with a given index of refraction, an input side formed with a first end face, a light extraction region adjacent the first end face, an outer coating with an index of refraction greater than the given index of refraction surrounding the cladding at the light extraction region, and a second end face distal from the first end face;

an optical device disposed to focus light to be coupled into the first end face of the pin stub;

the second end face of the pin stub resting on an end of a multimode optical waveguide;

the light extraction region tapering inwardly from the first end face of the pin stub, preferably in wedge-like or conical shape.

In other words, the invention provides for a light extraction region, in which the cladding (the jacket of the conductor) is surrounded by an outer coating of a material with a higher index of refraction than the index of refraction of the cladding material.

The advantage of the novel configuration is that because of the light extraction region, a large proportion of the light coupled into the cladding of the single mode optical waveguide of the pin stub is unavoidably not transmitted to the multimode optical waveguide and thus does not reach the core of the downstream multimode optical waveguide; this is ascribed to the fact that the light can escape laterally from the cladding of the single mode optical waveguide of the pin stub. This largely suppresses the excitation of modes and thus increases the bandwidth of the multimode optical waveguide.

The light extraction region can be embodied in various ways. It is considered to be especially advantageous if the light extraction region is adjacent to the first face end of the pin stub, because this makes the light extraction region relatively easy to produce.

The fact that the light extraction region tapers inwardly is advantageous above all because as a result the light present in the cladding of the single mode optical waveguide of the pin stub is out-coupled especially effectively; this design of the light extraction region is also advantageous from a technical production standpoint.

The wedgelike tapered light extraction region of the novel configuration can be made in various ways. In accordance with an added feature of the invention, therefore, the tapered light extraction region is formed of a hardened material introduced in liquid form into a tapered recess formed in the first end face of the pin stub. Preferably, the material is an adhesive.

In an advantageous embodiment feature of the invention, the light extraction region extends over the entire length of the pin stub, because the pin stub has a coating of an optically transparent, nonreflective material. This material is advantageously glass, whose index of refraction must be higher than the index of refraction of the cladding material of the single mode optical waveguide of the pin stub.

In this embodiment, it appears advantageous if a connecting element surrounding the one face end of the pin stub and the one end of the multimode optical waveguide is made of the transparent, nonreflective material. The advantage of this embodiment is considered to be that in a connecting element embodied in this way, the light from the cladding of the single mode optical waveguide of the pin stub can be extracted laterally over the entire length of the pin stub.

Finally, in accordance with a concomitant feature of the invention, the light extraction region is formed of a material having a high degree of light absorption. In this embodiment, the light exiting from the cladding of the single mode optical waveguide of the pin stub is absorbed and accordingly can no longer reach the multimode optical waveguide.

Other features which are considered as characteristic for the invention are set forth in the appended claims.

Although the invention is illustrated and described herein as embodied in an configuration for coupling light into one end of a multimode optical waveguide, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

.BRIEF DESCRIPTION OF THE DRAWING

The FIGURE is a diagrammatic side view of a coupling configuration according to the invention.

DESCRIPTION OF THE PREFERRED EMBODIMENTS

Referring now to the sole figure of the drawing in detail, there is seen a novel configuration with a pin stub 1 from a single mode optical waveguide, which in the usual way includes both a core 2 and a cladding 3 surrounding the core. A coating 4 is applied to the cladding 3, again in a known manner. On one face end 5 (first end face 5) there is disposed an optical device 6—in the exemplary embodiment it is embodied by a lens—in front of the pin stub 1. A light bundle 8 originating at a light source 7 is focussed onto the core 2 of the pin stub 1, in the region of its one face end 5.

With its other face end 9 (second end face 9), the pin stub 1 contacts one end 10 of a multimode optical waveguide 11, of which only a first portion is shown in the drawing. The pin stub 1 is surrounded, in the region of its other face end 9 and jointly with the multimode optical waveguide 11, by a connecting element 12, which keeps the pin stub 1 and the multimode optical waveguide 11 in a defined position in the region of the other face end 9 of the pin stub 1 and the one end 10 of the multimode optical waveguide 11.

As the drawing also shows, the pin stub 1 is provided, in the region of its one face end 5, with a light extraction region 13, which tapers inward, in the longitudinal axis of the pin stub 1, from the one face end 5. This light extraction region 13 is formed by recessing the coating 4 in a wedge shape in the region of the one face end 5, and then introducing a material that hardens, such as an adhesive, into the recessed region. The material that hardens has an index of refraction which is higher than the index of refraction of the material of the cladding 3, so that the portion of the light focussed onto the one face end 5 of the pin stub 1 that is coupled into the cladding 3 can cross over from the cladding 3 into the light extraction region 13. Via the cladding 3 of the pin stub 1, only very little light therefore now proceeds to the multimode optical waveguide 11, and any excitation of modes in the multimode optical waveguide 11 is largely suppressed. Via the multimode optical waveguide 11, messages can then be transmitted with a wide bandwidth, in the form of pulses of light from the light source 7.

The corresponding triggering of the light source 7—preferably formed by a laser diode—is not described in detail for reasons of brevity and clarity. The driving of the light source 7 is well within the purview of those having skill in the pertinent art and it is of lesser importance in the context of the present invention.

I claim:

1. A configuration for coupling light into a multimode optical waveguide, comprising:

a pin stub of a single mode optical waveguide said pin stub having a cladding with a given index of refraction, an input side formed with a first end face, a light extraction region adjacent said first end face, an outer coating with an index of refraction greater than said given index of refraction surrounding said cladding at said light extraction region, and a second end face distal from said first end face;

an optical device disposed to focus light to be coupled into said first end face of said pin stub;

said second end face of said pin stub resting on an end of a multimode optical waveguide;

said light extraction region tapering inwardly from said first end face of said pin stub.

2. The configuration according to claim 1, wherein said light extraction region tapers in a wedge shape from said first end face.

3. The configuration according to claim 1, wherein said light extraction region tapers in a cone from said first end face.

4. The configuration according to claim 1, wherein said tapered light extraction region is formed of a hardened material introduced in liquid form into a tapered recess formed in said first end face of said pin stub.

5. The configuration according to claim 4, wherein said material is an adhesive.

6. The configuration according to claim 1, wherein said light extraction region is formed of a material having a high degree of light absorption.

* * * * *